July 31, 1956

H. BOLZMANN 2,757,354

ECHO LOCATING SYSTEMS USING SONIC OR SUPERSONIC PULSES

Filed July 19, 1950

Inventor:
Hans Bolzmann
By Knight Bros.
Attorneys

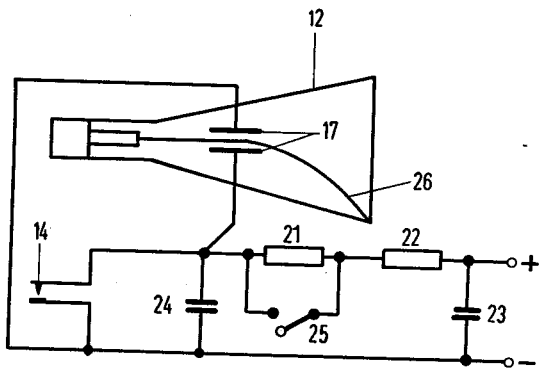
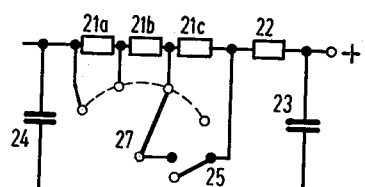
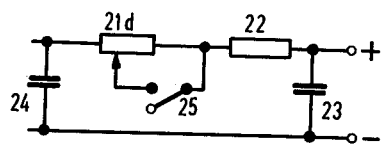
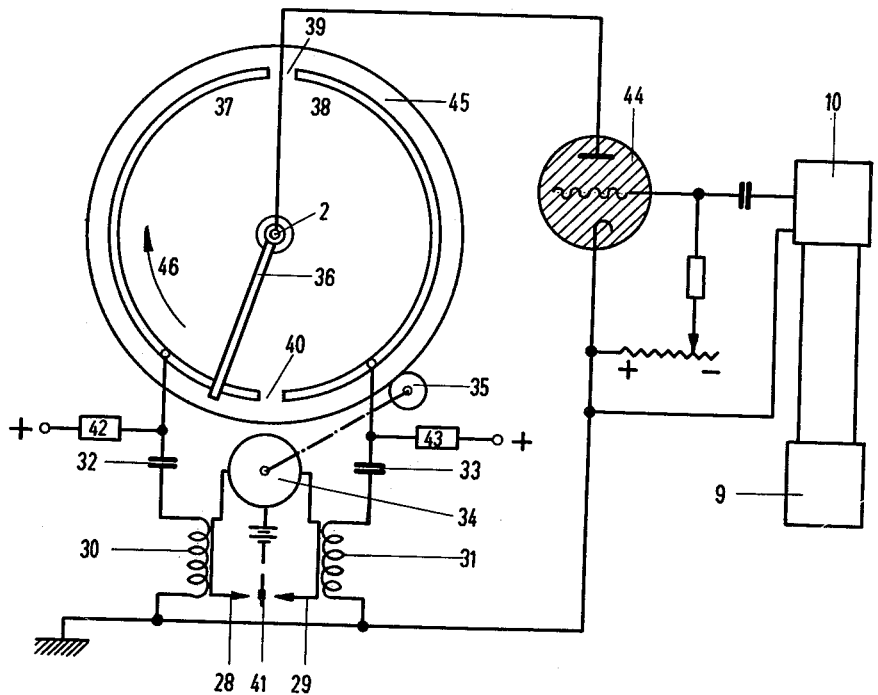

United States Patent Office 2,757,354
Patented July 31, 1956

2,757,354
ECHO LOCATING SYSTEMS USING SONIC OR SUPERSONIC PULSES

Hans Bolzmann, Kiel, Germany, assignor to Electro-acustic Gesellschaft m. b. H., Kiel, Germany, a German corporation Application July 19, 1950, Serial No. 174,738

Claims priority, application Germany July 19, 1949

2 Claims. (Cl. 340—3)

My invention relates to echo locating systems using sonic or supersonic pulses, and more particularly to systems employing a cathode ray tube on whose screen the objects to be detected are displaced by modulation of an electron beam.

It is an object of my invention to provide means especially well suitable for detecting underwater objects, for instance, determining the location and other details of a shoal of fish or even a single fish, or for exactly indicating the depth and the nature of the sea bottom.

The known echo sounding systems have echo sounding equipment of a certain maximum sounding range or survey range to determine any discernible object within the entire range distance, for instance, of 600 meters. Such systems are not satisfactory for determining such submerged objects as fish. For instance, while the system may show the depth of the top area of a passing shoal of fish by surface reflection of the echo, it does not reveal more detailed information such as the bottom depth of the shoal.

It is therefore a more particular object of my invention to devise an echo sounding system which affords a more detailed investigation of objects than heretofore obtainable and to greatly increase the resolving power of such systems so that, for instance, information on the nature and dimension of a shoal of fish becomes available.

In accordance with my invention, I divide from the total sounding range a relatively small partial range and display this partial range essentially over the whole effective screen area of the cathode ray tube. For instance, if the total sounding range of the system is about 600 meters, the fractional range cut out therefrom and spread over the screen may be only 15 meters.

According to another feature of my invention, the partial range is shifted to any desired position within the total range continuously or in steps by mechanically controlling the delay between the pulse mission and the start of the indication on the cathode ray tube.

More specifically, I provide the echo sounding apparatus with a mechanically adjustable phase shift mechanism which controls the periodic emission moment or interval of the transmitter pulses and permits varying or displacing the periodically recurrent image-producing periods relative to that moment or interval.

According to another feature of my invention, the mechanical device for controlling and phase shifting the pulse transmission and image reception has a revolvable control shaft driven at constant speed and acting, preferably with the aid of cams, upon electric contacts one of which controls the triggering of a single-stroke pulse generator, while another contact triggers the sweep generator of the image-producing cathode ray tube, the actuating moments of the two contacts being phase adjustable relative to each other by an angular displacement of the contacts or of the actuating cams about the axis of shaft revolution.

According to a further feature of the invention, the apparatus is equipped with means for switching over from a representation of the total sounding range to a representation of a selected partial range and vice versa. This permits supervising the total range as well as the detailed inspection of any partial range without using separate oscilloscopes.

Another feature of the invention consists in a device for a continuous or step-by-step control of the extent of the exhibited partial sounding range, permitting the partial range to be altered, for instance, from 15 to 30 meters.

Still another feature of the invention relates to means that keep the image of the sea bottom automatically at a fixed level on the screen. This is important to the supervision of the partial range immediately above ground or for the inspection of the nature of the sea bottom itself.

These and other objects, features and advantages of the invention will be apparent from, and will be referred to in, the following description in conjunction with the drawings in which:

Figs. 2, 2a, 2b are three schematic circuit diagrams of respective sweep circuits applicable in apparatus according to Fig. 1 and containing device for switching over from "total range" to "partial range";

Fig. 3 is a schematic diagram of a control device applicable in connection with the apparatus of Fig. 1 and serving for automatically adjusting the echo picture to a certain level on the screen of the cathode ray tube as well as for automatically setting the distance indicating device;

Figure 1:
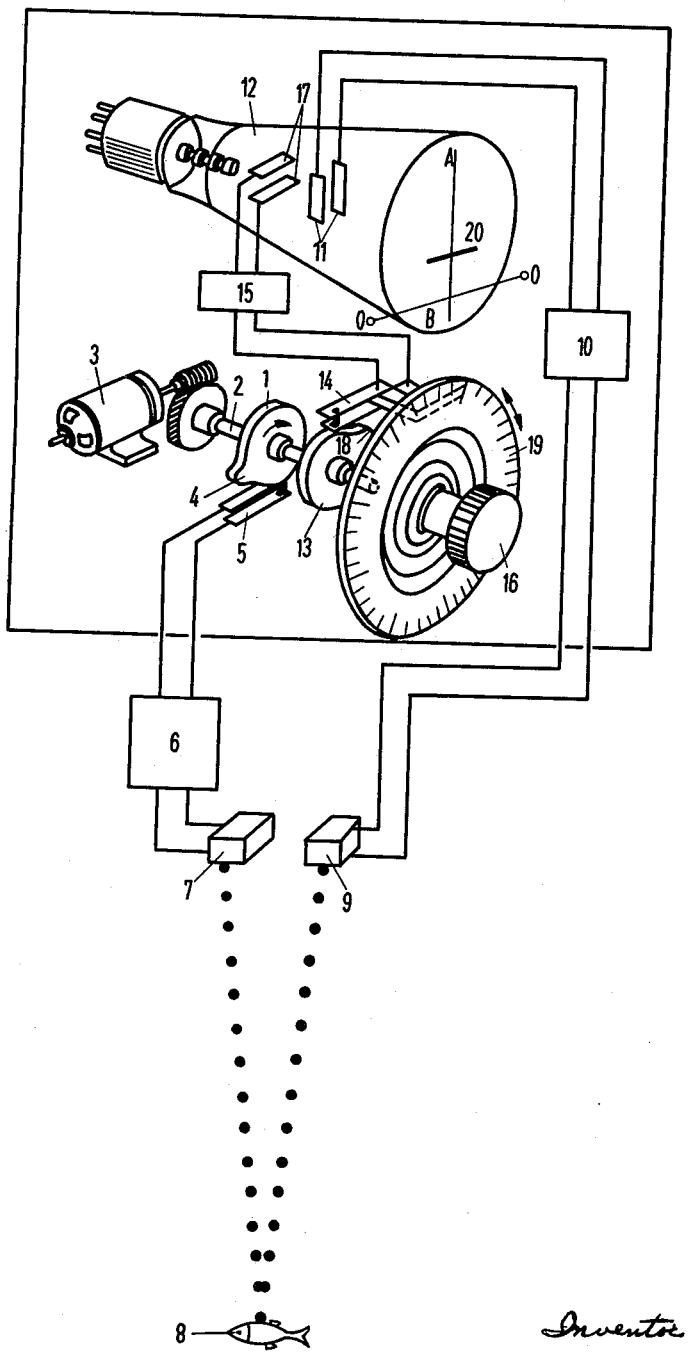
Fig. 1 shows schematically, and partly in perspective, a simple embodiment of a fish finding apparatus according to the invention.

The apparatus shown in Fig. 1 is equipped with a generator 6 for the sounding pulses and a sweep generator 15. These generators are of the known single-stroke type and, when triggered, produce only one pulse or sweep. The period of time which elapses between triggering the two generators can be controlled by hand. The luminous point of the cathode ray tube 12 appears on the screen only after triggering the sweep and then remains on the screen during a predetermined time interval corresponding to the range to be sounded.

Two cam discs 1 and 13 are mounted on a shaft 2 driven by a motor 3 at a constant speed. When passing by a spring contact 5, cam 4 triggers the pulse generator 6 which may have a shock circuit or a pulse generating valve set to emit a single pulse of sonic or supersonic frequency. The electric pulse is transformed into a pressure pulse by an emitter 7 which may be of the magnetostriction type. After reflection from the obect 8, the pressure pulse strikes the receiver 9 which may be of the same type as the emitter. The electric pulse generated in the receiver passes through an amplifier 10 to the deflecting plates 11 of the tube 12.

The cam 18 of the other cam disc 13, when passing by a spring contact 14, triggers the sweep generator 15 which then applies a single saw tooth voltage to the vertical plates 17 of the tube 12. This causes the cathode ray to pass across the screen of the tube, thereby writing a vertical luminous line AB. The luminous indication is visible only during the sweep interval. Hence, any pulses applied to the horizontal plates 11 will not be indicated unless they arrive during that interval. By controlling the initiation and the speed of the sweep, any desired partial range of the total range may thus be chosen for indication.

To control the start of the sweep, contact 14 is mounted on the back of a rotatable dial disc 19. The whole circumference of this dial corresponds to the maximum sounding range of, for instance, 600 meters and is subdivided, for instance, from 10 to 10 meters. By turning a knob 16, the dial 19 with contact 14 may be adjusted to any desired position, thus regulating the time delay between the emission of the sounding pulse and the start of the sweep.

In the zero position, there is no delay at all. The device in this case is set to "total range" indicating the whole survey range of 600 meters on the screen.

By turning the dial out of the zero position, the device, by means of a limit switch (25 in Fig. 2), is set to "partial range." Then the sweep of the generator 15 is speeded up, for instance, thirty times to result in a partial range of 20 meters. It is desirable to choose the sweep a little faster than would correspond to the exact partial range of 15 meters in order to have this range indicated above the zero level 0—0 after adjusting the echo picture 20 of an object to this level. The zero level 0—0 may be represented by a wire fixed in front of the screen. By turning knob 16, the picture 20 can be moved up and down relative to the zero level or can be made to coincide with that level. The apparatus can be adjusted so as to indicate the exact distance of the object on dial 19 when picture 20 coincides with the zero level.

Fig. 2 shows the sweep circuit of the apparatus. The circuit is energized at its terminals (+) and (—) by a D.-C. voltage supply (not shown) and comprises two resistors 21, 22 and two capacitors 23, 24. The voltage across the capacitors determines the potential of the vertical deflecting plates 17 of tube 12. With switch 14 open, the electron beam 26 is adjusted to stay beneath the effective screen area of the tube, thus being invisible as along as no sweep voltage is applied. When contact 14 is actuated, as described in connection with Fig. 1, capacitor 24 is shorted and discharges suddenly. Beam 26 is thus caused to jump to the upper edge of the screen at a speed so fast as to leave its track practically invisible. When contact 14 is released and opens, capacitor 24 is charged at a rate dependent upon the resistances of resistors 21, 22. The rising sweep potential then causes the electron beam to move downward along a vertical line. Incoming echo pulses are not displayed on the screen unless they arrive during the period of this downward sweep.

With both resistors 21, 22 effective, the sweep rate is low, corresponding to the "total range" setting. When switch 25 is closed, the resistor 21 is shorted, and the apparatus is set to "partial range." In this case, after contact 14 is opened, capacitor 24 will be recharged at a high speed resulting in a faster sweep rate.

Fig. 2a shows a modified sweep circuit with several resistors 21a, 21b, 21c instead of a single resistor 21. With such a circuit, several sounding ranges can be adjusted by means of a selector switch 27 which permits successively connecting the resistors to the switch 25.

According to Fig. 2b, showing another modification of the sweep circuit, resistor 21 of Fig. 2 is replaced by a regulable resistor 21d or rheostat to permit a continuous control of the size of the partial ranges.

Fig. 3, showing an automatic control device for adjusting the echo picture to a certain level on the screen of the cathode ray tube, will be explained in connection with Fig. 1. The device of Fig. 3 has a disc 45 of insulating material. This disc may be rigidly connected to the rotatably mounted dial disc 19 of Fig. 1, or it may be part of the dial disc itself. A contact arm 36 is rotatable in front of the disc 45. Arm 36 may be attached to shaft 2 rotating at a constant speed together with the cam disc 13 of Fig. 1 which initiates the sweep circuit of the cathode ray tube. Contact arm 36 is electrically engageable with arcuate contact rails 37, 38 which are separated from each other by insulating gaps 39, 40.

By means of a drive gear 35 actuated by a reversible servomotor 34, disc 45 can be set to any angular position with respect of cam disc 13. Contact 14 according to Fig. 1 may be attached to the dial disc 19 or, if a separate disc 45 is provided, may be attached to the latter disc.

A movable relay contact 41 engageable with either of two stationary contacts 28 and 29 controls the motor 34 to run in either direction. Relay contact 41 is controlled by two relay coils 30, 31 which are series connected with respective capacitors 32, 33 and respective resistors 42, 43. The relay circuits 30, 32, 42 and 31, 33, 43 are energized by D.-C. voltage, the capacitors remaining charged as long as no pulse arrives from receiver 9 and amplifier 10. During this period of time a gas discharge tube 44 is blocked by a negative bias so that the relay coils 30, 31 are deenergized and the motor 34 is at rest. On receiving a pulse, tube 44 is fired and capacitor 32 is suddenly discharged. Relay coil 30 is energized and starts the motor 34 to rotate disc 45, for instance, clockwise as shown by arrow 46. Motor 34 keeps running as long as capacitor 32 draws charging current through relay coil 30. The next incoming pulses cause this process to be repeated until the disc 45 reaches such an angular position that the echo pulse coincides with a moment when contact arm 36 lies over the gap 39. Then relay coil 30 releases the movable relay contact 41, and motor 34 is switched off.

In this way, contact 14 on disc 19 or disc 45 is set automatically to trigger the sweep in dependence upon the received echoes, and the dial on disc 19 is adjusted to give continuous readings of the depth or distance of an obstacle.

This feature of the invention affords a continuous and automatic survey of a certain depth range immediately above sea ground which is of great importance to fishery.

The repetition rate of the sonic or supersonic pulses in the known echo sounding systems whose screen image covers the total sounding range are rather slow in order to render the image unambiguous. This, however, results in fluctuating images thus compounding the difficulty of discerning details. In apparatus according to the invention, showing an image of only a selected and magnified partial range, such fluctuations are generally less disturbing but may still affect the quality of the screen image when more remote partial ranges are being sounded, especially the partial range immediately above the sea bottom.

It is therefore also an object of my invention to improve the steadiness of the screen image without rendering it ambiguous. To this end, and in accordance with another feature of my invention, the sonic or supersonic echo sounding apparatus are equipped with a pulse transmitting device issuing an irregularly spaced pulse sequence instead of a single pulse.

Figure 4:
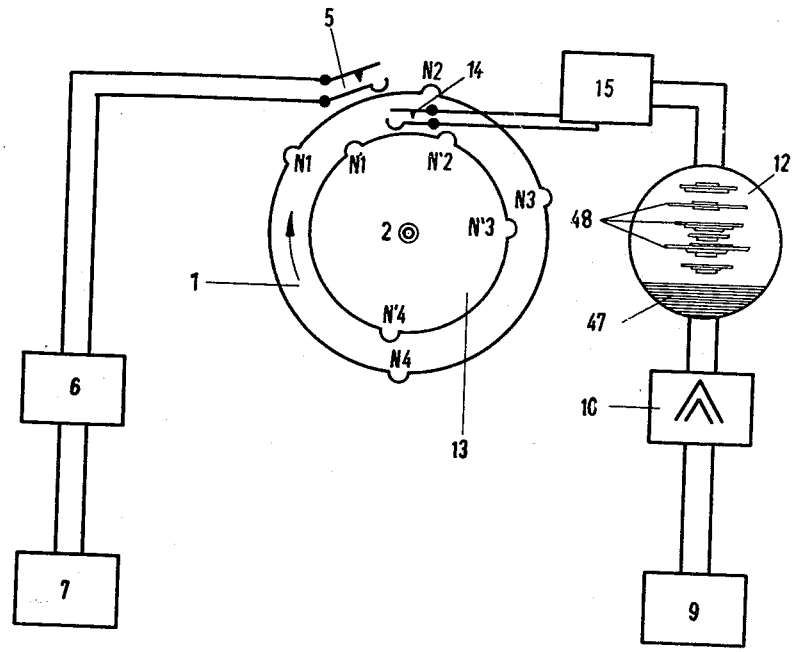
Fig. 4 shows schematically a modified apparatus according to the invention operating with an irregularly spaced pulse sequence instead of a single pulse to thereby increase the number of sonic or supersonic pulses per second for securing pictures free from fluctuation.

The embodiment of such a device shown in Fig. 4 is applicable in conjunction with apparatus otherwise designed in accordance with Fig. 1, corresponding reference numerals being used in both figures for denoting similar respective elements.

The apparatus according to Fig. 4 differs from that of Fig. 1 by having the cam disc 1 of its pulse control device equipped with a plurality of cams $N_1$ to $N_4$, all acting on the contact 5 to trigger the pulse generator 6 for transmitter 7. The number and peripheral spacing of the cams determine the number and spacing of a pulse sequence. Another cam disc 13 fixed on the shaft 2 of cam disc 1 has cams $N_1'$ to $N_4'$ of an angular spacing similar to that of cams $N_1$ to $N_4$. Cams $N_1'$ to $N_4'$ actuate the contact 14 of the sweep circuit 15. In this way, four pulses are sent out instead of a single one, the sweep being triggered four times for each full revolution of the cam discs. To secure coincidence of the images produced by the incoming pulses on the screen of tube 12, contact 14 must be adjusted to a proper angular position relative to cam disc 13, so that the echo pulse started by cam $N_1$ comes in immediately after cam $N_1'$ has triggered the sweep. Then the following echo pulses will be superimposed exactly at the same spot on the screen. When contact 14 is not properly adjusted, the echo pulses will not coincide on the screen, resulting in indistinct or ambiguous images. On the screen of the tube 12 shown in Fig. 4 the sea bottom appears at 47 and the images of several obstacles such as a shoal of fish are indicated at 48.

In apparatus according to Fig. 1 and modified in accordance with Figs. 3 and 4, the cam discs 1 and 13 may be replaced by a single disc to actuate contact 5 as well as contact 14. By employing two separate discs, however, these contacts may be arranged more conveniently in space. On the other hand, with two separate cam discs one of which is adjustable on shaft 2 in its angular position to the other disc, contacts 5 and 14 may be fixed. The latter modification is not so simple as that described with reference to Figs. 1 and 3, as it requires means for controlling the angular setting of the cam discs, such means being known, for instance, from automatic computers.

Apparatus according to the invention and as described above may be further improved to facilitate recognizing any motion or other alteration of a shoal of fish or the like objects within the selected partial sounding range being indicated. To this end, a cathode ray tube with a long afterglow is used in conjunction with an additional sweep to keep the image of the sounded objects on the screen a certain extended period of time, for instance, of 10 seconds.

Figure 5:
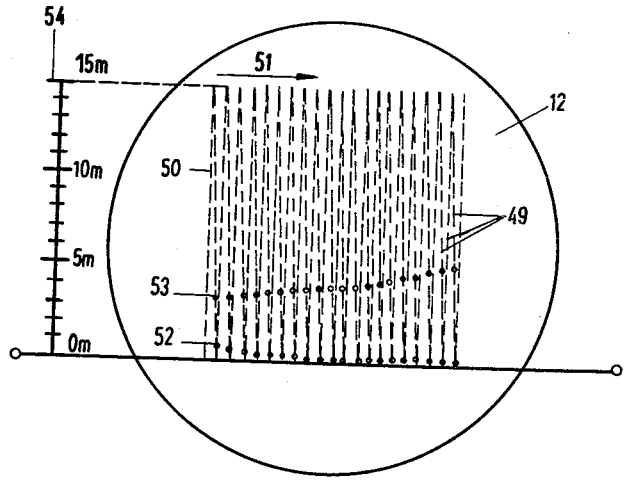
Fig. 5 shows an echo picture of the type obtained in apparatus according to the invention by employing a cathode ray tube with a screen of long afterglow characteristics and an additional slow sweep in the horizontal direction.

The kind of image thus obtainable is exemplified by the screen represented in Fig. 5. This image results from using an additional device to produce a slow periodic sweep in the horizontal direction and rendering the received echo pulses visible by applying them to the control grid of the cathode ray tube thus unblanking the cathode beam normally suppressed by a sufficiently negative bias.

The horizontal sweep rate is selected to be rather long relative to the vertical sweep rate, and a screen of a correspondingly long afterglow, for instance of about 10 seconds, has to be employed. These requirements resemble those for the production of a picture in a television receiver, with the exception of the slower sweep rates in apparatus according to the invention. The device for delivering the slow-sweep voltage to the horizontal deflecting plates may be of the kind usually employed in cathode ray oscilloscopes to produce periodic saw tooth voltages; or a sweep circuit of the kind shown in Fig. 2 may be used with an additional cam disc on shaft 2 for periodically triggering the sweep circuit, for instance, every ten seconds.

In Fig. 5, the invisible tracks of the blanked cathode beam are entered as dash lines 49, the initial position of the beam being marked by the vertical line 50. By applying the slow sweep to the horizontal plates of tube 12, the track is shifted from its initial position in the direction of arrow 51. The echo marks of the bottom and of an obstacle above it are indicated as spots tracing the dotted lines 52 and 53, respectively. Conveniently the picture is adjusted so that the bottom line is on or slightly above the zero mark 0—0. On a vertical scale 54, which may be fixed at one side or in front of the screen of the cathode ray tube, the distance of the obstacle from ground may be read off immediately. Means may be provided for shifting the electron beam laterally simultaneously with unblanking it, resulting in small horizontal dashes which line up to a smooth and continuous line instead of the dotted track 53.

Due to the storing effect of the afterglow, the continuity of the image is improved thus facilitating the inspection and study of any selected partial range under observation.

A simultaneous representation of the total sounding range and of any selected partial range may be had, according to another feature of the invention, by using a twin cathode ray tube or two separate tubes instead of the single-image tubes heretofore mentioned.

Figure 6:
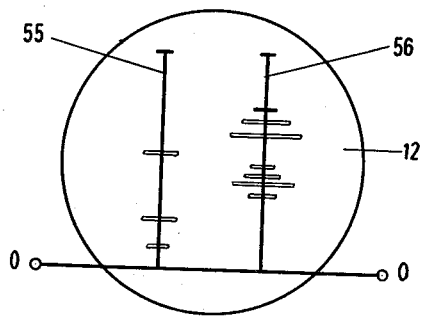
Fig. 6 shows schematically the screen of a twin-beam tube simultaneously representing the total sounding range as well as a selected partial range.

Fig. 6, for instance, shows the screen of a twin-beam cathode ray tube. The first beam displays at 55 the total sounding range, for instance, of 600 meters. The other beam displays at 56 a partial range, for instance, of 15 meters. Thus a side-by-side representation of the two ranges is achieved. In this case, an apparatus as shown in Fig. 1 may be employed to indicate the total range, the elements of the sweep circuit being designed in accordance with this range.

In addition, another cam arrangement triggering a separate fast-sweep generator has to be attached to shaft 2 in Fig. 1 to control the partial range indication. The sweep circuits may be of the kind shown in Fig. 2, the elements 21 and 22, which in this case are to represent a single resistor, having appropriate resistances. No additional amplifier is needed, as the output of amplifier 10 may be employed to deflect both cathode beams of the tube 12.

Figure 7:
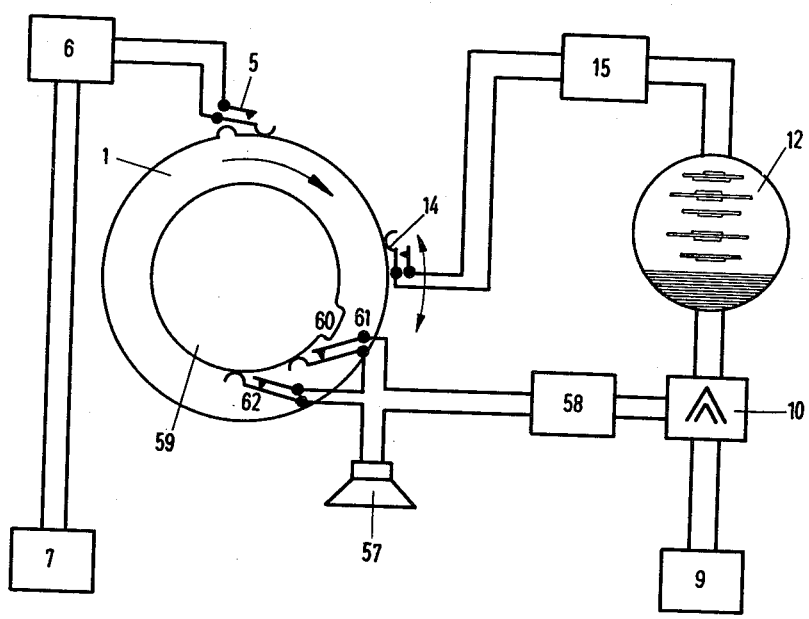
Fig. 7 is a schematic illustration of apparatus according to the invention with an additional device for acoustical indication of the echo pulses.

The apparatus shown in Fig. 7, is equipped, according to another feature of the invention, with a device for the additional acoustical indication of the echo pulses. The echo sounding plant may be constructed as described with reference to Fig. 1 or the following figures, corresponding parts in Fig. 7 having the same respective reference numbers as in the preceding figures. For simplicity the cam disc 1 shown in this figure combines the functions of the two cam discs 1 and 13 of the foregoing figures.

For the acoustical indication of the echo signals, a loudspeaker 57 is provided. To secure indication when the sounding is carried out with supersonic frequencies, for instance, 30 kilocycles, a beat circuit 58 coupled to the amplifier 10 is provided to produce audible beat frequencies. For example, a fixed oscillator frequency of 27 kc. is superimposed upon the frequency of 30 kc. of the received echo pulse so that a beat note of 3 kc. is brought about.

To block off the echoes coming directly from the emitter and from the sea bottom, an additional cam disc 59 with a cam 60 is mounted on shaft 2 and actuates two contacts 61 and 62. Contact 61 is normally closed and is opened by cam 60. During the opening period no echo can be received by the loudspeaker. This is essential to cut off the pulses coming directly from the emitter 7.

The other contact 62 is rotatably mounted to be opened by cam 60 at any desired instant, thus permitting the observer to mask off echoes reflected by the sea bottom. As these echoes are of relatively long continuance, cam 60 must be rather wide.

The loudspeaker 57 of such an apparatus remains virtually silent as long as no objects above sea bottom are being sounded but starts emitting audible signals as soon as, for instance, a shoal of fish is encountered.

I claim:

1. In sonic or supersonic echo sounding apparatus for locating shoals of fish and for providing information enabling a determination of the kind of fish located, the combination of a pulse transmitter, transmitter control means connected with said transmitter and having a first control contact, an echo-pulse receiver, a cathode ray tube having signal electrodes connected with said receiver and having a sweep circuit comprising a sweep generator and a second control contact for triggering said generator, said sweep circuit having a variable sweep period of small duration relative to the time spacing between said transmitter pulses, and a revolvable control device joined with said first and second contacts for operating them periodically, said control device having selectively and continuously adjustable phase shift means for varying the phase relation of the respective contact operations whereby said sweep circuit means can be triggered at any instant intermediate the issuance of consecutive pulses of said recurrent pulses.

2. In sonic or supersonic echo sounding apparatus for locating shoals of fish and for providing information enabling a determination of the kind of fish located, the combination of a pulse transmitter, transmitter control means connected with said transmitter and having a first control contact, an echo-pulse receiver, a cathode ray tube having signal electrodes connected with said receiver and having normally ineffective sweep circuit means comprising a second contact periodically operable to trigger said sweep circuit means, said sweep circuit means having a sweep period of small duration relative to the time spacing of said transmitter pulses, a control device having revolvable cam means engageable with said first and second contacts for operating them in synchronism with each other and having continuously adjustable means rotatable about the axis of revoluion of said cam means for phase displacing the respective cam engagement moments of said two contacts relative to each other, an automatic level adjusting device for maintaining the signal image at a desired level, said device having a contact arm revolvable together with said cam means and having an insulating structure revolvable about the axis of said arm independently of said cam means, said structure being mechanically joined with one of said two contacts for angularly adjusting it relative to said other contact, two complementary contact segments mounted on said structure and electrically engageable by said arm, said segments being spaced from each other to form a gap wider than said arm to break the electric engagement when said arm coincides with said gap, and reversible servomotor means having two direction controlling circuits connected with said respective segments and extending through said arm, said circuits being connected with said receiver for controlling said structure to adjust said one contact in response to received echo pulses so as to maintain said desired image level.

References Cited in the file of this patent
UNITED STATES PATENTS

| | | |
|---|---|---|
| 1,983,254 | Turner | Dec. 4, 1934 |
| 2,143,035 | Smith | Jan. 10, 1939 |
| 2,399,017 | Goldman | Apr. 23, 1946 |
| 2,454,782 | De Rosa | Nov. 30, 1948 |
| 2,461,998 | Patterson | Feb. 15, 1949 |
| 2,471,408 | Buisgnies | May 31, 1949 |
| 2,504,852 | Lewis | Apr. 18, 1950 |
| 2,552,022 | Watson | May 8, 1951 |
| 2,556,212 | Page | June 12, 1951 |
| 2,568,441 | Flyer | Sept. 18, 1951 |
| 2,600,335 | Schnieder | June 10, 1952 |

FOREIGN PATENTS

| | | |
|---|---|---|
| 236,601 | Great Britain | June 29, 1925 |